Sept. 1, 1964      A. G. LAUCK ETAL      3,147,103
GLASSWARE COOLING AND TRANSFER APPARATUS
Filed Jan. 7, 1960      2 Sheets-Sheet 1
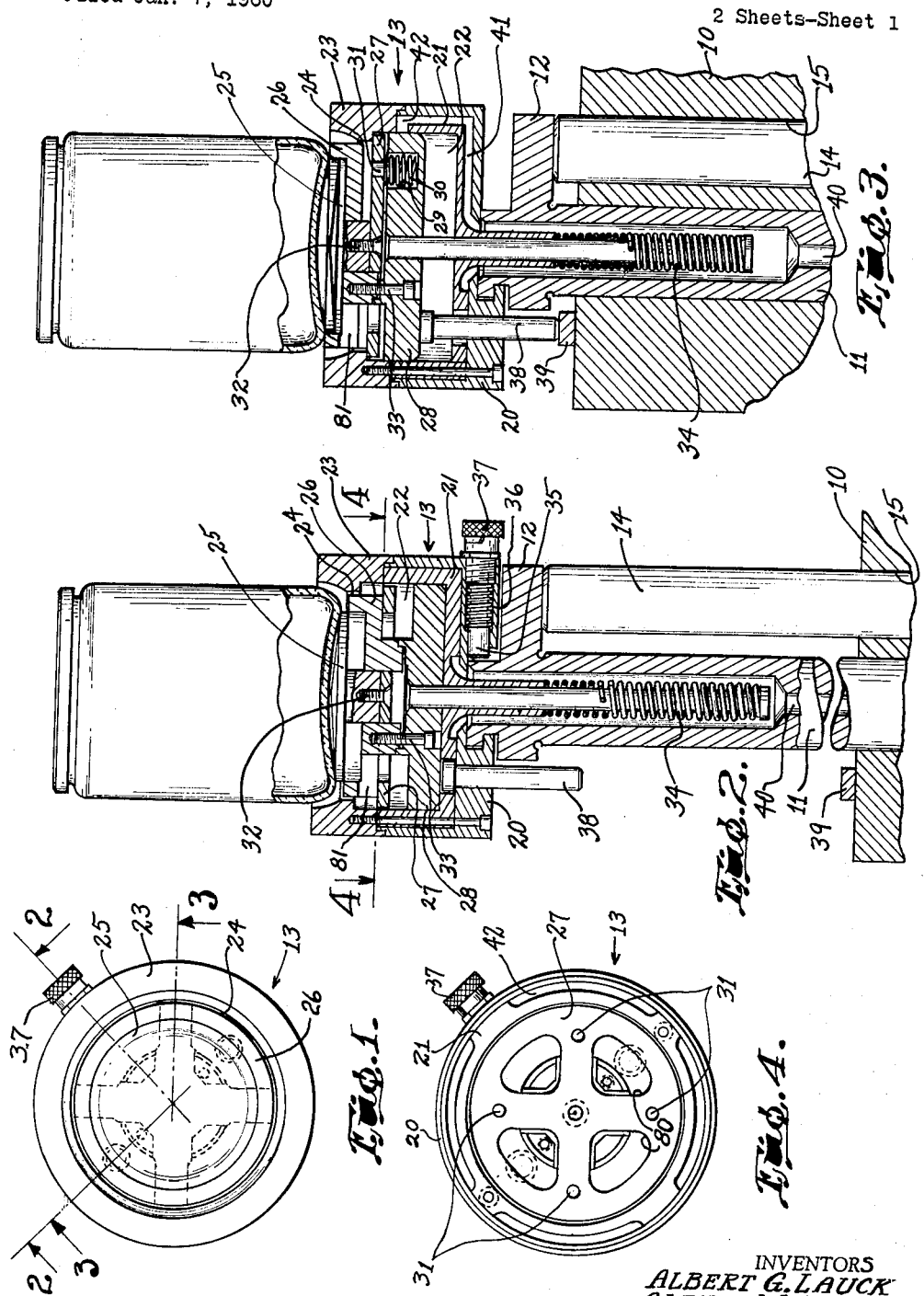
INVENTORS
ALBERT G. LAUCK
ALBERT W. RIECK
EUSTACE H. MUMFORD
ATTORNEYS Sept. 1, 1964
A. G. LAUCK ETAL
3,147,103
GLASSWARE COOLING AND TRANSFER APPARATUS
Filed Jan. 7, 1960
2 Sheets-Sheet 2
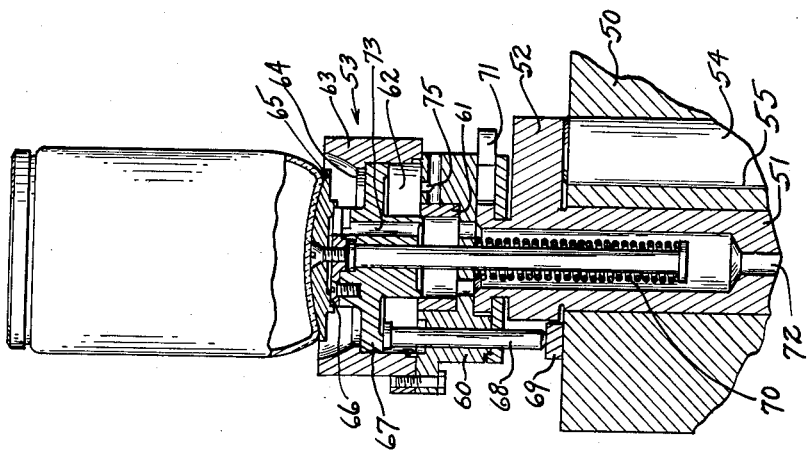
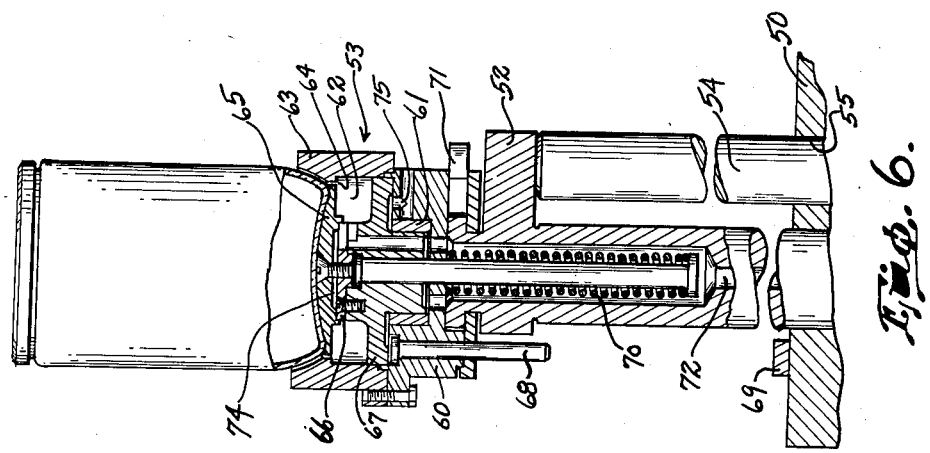
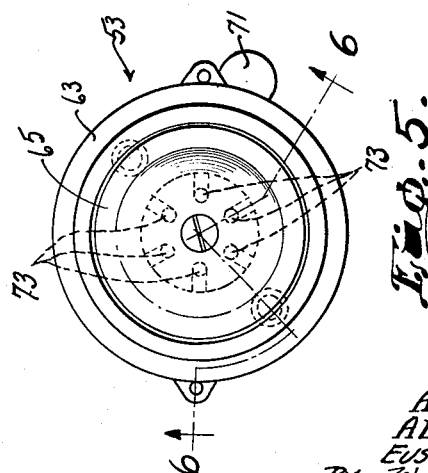
INVENTORS
ALBERT G. LAUCK
ALBERT W. RIECK
EUSTACE H. MUMFORD
BY
ATTORNEYS

2

United States Patent Office 3,147,103
Patented Sept. 1, 1964

3,147,103
GLASSWARE COOLING AND TRANSFER APPARATUS
Albert G. Lauck, Toledo, Ohio, Eustace H. Mumford, Ottawa Lake, Mich., and Albert W. Rieck, Waterville, Ohio, assignors to Owens-Illinois Glass Company, a corporation of Ohio
Filed Jan. 7, 1960, Ser. No. 964
4 Claims. (Cl. 65—348)

This invention relates to apparatus for cooling and transferring glassware. U.S. Patent 2,833,088, issued May 6, 1958, to R. H. Olson et al., is an example of this type apparatus and it is contemplated that the present invention constitutes an improvement thereover.

It has been found that in using a device as disclosed in U.S. Patent 2,833,088 at relative high speed, the ware support becomes excessively heated, causing some slight distortion of the bottom of the ware, when the ware is released to the support. Further, where the bottom of the ware is concave and the support complementally convex, there is a possibility that if the ware is not adequately cooled, on the bottom, it may stick to the support with the result that a sweepout arm will tip the ware rather than slide it smoothly from the support.

When the ware has a relatively deep concave bottom with a cooperating high convex support, the ware cannot be easily moved sideways from the support by a side engaging sweepout arm.

It is an object of this invention to provide a transfer device having improved supporting surface cooling.

It is a further object to provide a transfer apparatus for glassware wherein the ware support is retractable and the ware is positioned for easy lateral sliding movement relative to the transfer head.

Referring to the accompanying drawings:

FIG. 1 is a plan view of one embodiment of the apparatus;

FIG. 2 is a sectional view at the line 2—2 on FIG. 3;

FIG. 3 is a view similar to FIG. 2 showing the parts in a different position and taken on the line 3—3 on FIG. 1.

FIG. 4 is a plan view taken generally along line 4—4 of FIG. 2 with the air guide, support plate and support ring removed;

FIG. 5 is a plan view of a second embodiment of the apparatus;

FIG. 6 is a sectional view at line 6—6 of FIG. 5; and

FIG. 7 is a view similar to FIG. 6 showing the parts in a different position.

Referring to FIGS. 1-4, the apparatus comprises a base 10 mounted on a stationary portion of a glass shaping machine. A shaft 11 vertically reciprocable in the base 10 supports an upper crosshead 12 formed on the upper end of the shaft 11 and a head 13 is releasably mounted on the crosshead 12. A glass article positioned on the head 13 is moved vertically by the vertical movement of the shaft 11.

Vertical movement of the shaft 11 is achieved by a rod 14 contacting the under surface of the crosshead 12 and projecting downwardly into a cylindrical opening 15 in the base 10. The lower end of the rod 14 (not shown) may take the form of a piston whereby when fluid is applied to the cylindrical opening 15 in the base 10 the rod 14 will be forced upwardly.

The head 13 comprises a cup-shaped housing or body 20 having a cup shaped guide ring 21 seated therein and forming a cavity 22. The upper surface of the housing is closed by an annular air guide 23. The air guide 23 is formed with an opening 24 and an article support plate or shape maintaining member 25 is positioned in the opening. The opening 24 and the support plate 25 are so dimensioned that an annular area is provided between the edge of the support plate 25 and the inner wall of the opening 24. Within the annular area a supporting ring 26 is mounted for vertical movement relative to the support plate 25 and the air guide 23. The support plate 25 being generally T-shape in cross-section is connected at its lower end to a retracting ring or plate 27 positioned in the cavity 22. Mounted below the retracting ring 27 is a pedestal or plate 28 which is vertically movable within the cavity 22 and carries the support ring 26 on its upper surface. The pedestal 28 has four radially spaced recesses 29 in the upper surface thereof and coil springs 30 are mounted within the recesses 29. Directly above the coil springs and in contact therewith are spring retaining pins 31 mounted in openings in the retracting ring 27. The pins 31 serve to maintain the springs 30 in proper alignment within the recesses 29 and in abutting relation with the ring 27.

The shape maintaining member or support plate 25 is fastened to the retracting ring 27 by a central screw 32 and the support ring 26 is fastened to the pedestal 28 by means of a pair of screws 33, one of which is shown in FIGS. 2 and 3.

The pedestal 28 and in turn the support ring 26 are urged downwardly under the action of the spring 34 and due to the fact that the support ring 26 contacts the upper surface of retracting ring 27 the article support plate 25 will also be held down in retracted position as shown in FIG. 2. The head 13 is releasably mounted on the shaft 11 by a pin 35 urged against the shaft 11 by means of a spring 36. A knob 37 is mounted on the end of the pin 35 whereby the pin can be pulled laterally outwardly away from the head 13 to release the body 20 from the shaft 11.

A pin 38 is mounted in the housing 20 and contacts the lower surface of the pedestal 28. The end of the pin 38 projects downwardly out of the housing 20 whereby when the head 13 is moved downwardly the projecting end of pin 38 contacts the upper surface of a stop block 39 mounted on the upper surface of the base 10, causing the pedestal 28 to move upwardly relative to the air guide 23. As shown in FIGS. 2 and 3, the surface of the air guide 23 surrounding the opening 24 is so dimensioned and contoured that a limited space is provided between the walls of the opening and the outer surface of an article positioned on the support plate 25. The walls of the opening in air guide 23 have approximately the same configuration as that of the bottom of the glass article to be positioned therein.

A cooling fluid such as air is supplied to the apparatus through a passageway 40 in the shaft 11 and thence outwardly through radiating passageways 41 in the under surface of guide ring 21 and then vertically upward through annular areas or passages 42 which open into cavity 22. Air within the cavity 22 passes out through the annular opening 24 in air guide 23 after passing through openings 80 in the retracting ring 27 and openings 81 in supporting ring 26 to impinge on the bottom surface of the article support plate or shape maintaining member 25. As air under pressure is exhausted through the opening 24 in the air guide 23, it impinges on the sides and bottom of the glass article and by reason of the fact that the annular opening 24 is relatively small a "venturi" effect is produced which tends to hold the article in close contact with the article support plate 25.

The operation of the above disclosed apparatus may be summarized as follows: Initially the head 13 is in its uppermost position and the article support plate 25 is lowered within the head 13. After an article of glassware is removed from the forming apparatus it is placed on the article support plate 25 in the head 13. A cooling fluid passing between the support plate 25 and the walls of the opening 24 in the air guide 23 serves to form a layer or blanket of air surrounding the lower end of the article and cooling the article. Furthermore, due to the fact that the support plate 25 is exposed along substantially all of its surfaces it likewise will be cooled to some degree and as a result thereof transfer of the ware from the support plate 25 will be made easier.

After the ware has remained on the head a predetermined length of time sufficient to cool the ware, the head 13 is lowered in substantially the same manner as taught in U.S. Patent 2,833,088, issued May 6, 1958, to R. H. Olson et al. When the head reaches its lowermost position the pin 38 contacts the upper surface of the stop block 38 causing the pedestal 28 and support ring 26 to be elevated with respect to the air guide 23. The support ring thus engages the lower edge of the ware and supports the ware in a plane coincident with the top of the air guide 23. At the same time the article support plate 25 is retracted within the support ring 26 and the upper surface of the support plate 25 being slightly below the horizontal plane defined by the top of the air guide will allow the ware to be moved laterally from the head 13. For example, as shown in FIG. 3, movement of the head 13 relative to the pedestal 28 occasioned by retraction of the head 13 will substantially cut off the introduction of air to the head 13 by reason of the fact that the outer periphery of the pedestal will overlie the passages 42 and prevent the intrusion of air into the cavity 22.

Referring to FIGS. 5–7, there is illustrated a second embodiment of the invention. This second embodiment is similar in operation to the previously described embodiment but differs somewhat in its structural detail. The apparatus comprises a base 50 mounted on a stationary portion of a glass shaping machine. A shaft 51 vertically reciprocable in the base 50 supports an upper crosshead 52 formed on the upper end of the shaft 51 and a head 53 is reciprocably mounted on the crosshead 52. A glass article positioned on the head 53 is moved vertically by the vertical movement of the shaft 51. Vertical movement of the shaft 51 is achieved by means of a rod 54 contacting the under surfaces of the crosshead 52 and projecting downwardly into cylindrical opening 55 in the base 50. The lower end of the rod 54 may be in the form of a piston whereby when fluid is applied to the cylindrical opening in the base the rod 54 will be forced upwardly.

The head 53 comprises a housing or body 60 having a cavity 61 therein and the upper surface of the body is closed by an air guide 63. The air guide 63 is formed with an opening 64 and an article support plate 65 is positioned in the opening. The opening 64 and the support plate 65 are so dimensioned that an annular area is provided between the edge of the support plate 65 and the wall of the opening. The support plate 65 is mounted on a mounting plate 66 which in turn is mounted on a vertically movable pedestal or plate 67 mounted for reciprocable movement within the cavity 62. A pin 68 is mounted in the housing 60 and contacts a lower surface of the pedestal 67. The end of the pin 68 projects downwardly out of the housing 60 whereby when the head 53 is moved downwardly the pin 68 contacts the upper surface of a stop block 69 mounted on the base 50 causing the pedestal 67 to move upwardly relative to the air guide 63. As shown in FIGS. 6 and 7, the area of the air guide 63 surrounding the openings 64 is so dimensioned and contoured that a limited space is provided between the walls of the opening and the outer surface of an article positioned on the support plate 65. The walls of the opening and air guide have approximately the same configuration as that of the bottom of the glass article to be positioned therein.

The pedestal 67 and in turn the support plate 65 are urged downwardly under the action of a spring 70. The head 53 is reciprocably mounted on the shaft 51 by means of a sliding locking member 71 which prevents relative rotation of the head 53 with respect to the shaft 51. The locking member 71 may be rotated to disengage the top of the shaft 51 to allow the quick release of the head 53.

Cooling fluid such as air is supplied to the apparatus through passageway 72 in the shaft 51 and thence upwardly through passages 73 to the cavity 62 of the head 53. From the cavity 62, a fluid passes upwardly through the opening between air guide 63 and support plate 65 around the bottom of the glass article. As can readily be seen, the passage of fluid through passages 73 will impinge on the under surface of the support plate 65 which is slightly recessed as shown at 74 which will permit circulation of cooling fluid over substantially the entire under surface of the support plate 65, alleviating any possibility of the ware sticking to the support plate at the time it is transferred therefrom. In order to prevent the entrapment of air below the pedestal 67 a vent passage 75 allows any entrapped air to be vented to atmosphere.

The operation of the second embodiment of the apparatus may be summarized as follows: Initially the head 53 is in its uppermost position and the support plate 65 is lowered within the head. After an article of glass 2 is removed from the forming apparatus, it is placed on the support plate 65 in the head 53. The cooling fluid passing between the support plate 65 and the air guide 63 serve to form a layer or blanket of air surrounding the lower end of the article and cooling the article. Further, by reason of the close proximity of the lower end of the article with the internal annular wall of the air guide 63, the flow of air therebetween has a relatively high velocity resulting in a venturi-like action which produces a holding down effect on the ware.

The ware having remained on the head 53 a sufficient length of time, the head 53 is lowered through the application of a downward force on the shaft 51. As the head 53 reaches its lowermost position, the pin 68 contacts the upper surface of the stop block 69 causing the pedestal 67 to be moved upwardly bringing the lower end of the glass article even with the upper surface of the air guide 63. The glass article may then be removed to a horizontal surface of the conveyor positioned adjacent the head 53.

During this travel of the article on the head 53, cooling air is being supplied both internally and externally of the ware and in particular the application of the air to the outer bottom portions of the article is applied in a configuration film having the approximate shape of the article. In other words, the article is positioned in the contour cavity 64 having a configuration similar to the bottom of the article. The walls of the cavity 64 do not have actual physical contact with the glass because of the air or fluid film provided between the cavity wall and the article. Thus, the article may be cooled by a means having a similar shape but having only fluid contact therewith.

By providing apparatus wherein a substantial portion of the ware support plate or shape maintaining member is exposed to a cooling medium, it is apparent that the previously encountered problem of ware sticking to the ware support plate has been alleviated.

Modifications may be resorted to within the spirit and scope of this invention as set forth in the appended claims.

We claim:

1. Apparatus for transferring and cooling glassware comprising a cup shaped, open-top body, an annular air guide fixed to the top of said body, said guide having an outwardly tapering inner surface at its top, a first plate loosely retained in said body, a ware support ring within said body, means for connecting said ring to said first plate in spaced overlying relationship, a second plate in said body between said first plate and said support ring, a ware bottom support member connected to said second plate and positioned within said support ring, means between said second plate and said first plate for biasing said plates apart, means for lowering said body and means responsive to lowering of said body for raising said first and second plates.

2. An apparatus in accordance with claim 1 wherein said air guide has an internal shoulder below said tapered inner surface, and said second plate has an external shoulder engageable with said internal shoulder upon lowering of said body to limit the vertical movement of said ware bottom support member to less than the vertical movement of said support ring.

3. An improved ware support for a ware transfer device comprising a cup shaped open-top body, an annular air guide mounted on said body and having a central opening therethrough with a configuration paralleling the bottom portions of the ware, a ware support ring positioned centrally of said air guide, said air guide and ring forming an annular opening therebetween, a shape maintaining member central of said support ring, means within said body for supporting said ring, means within said body for supporting said shape maintaining member, first resilient means between said ring supporting means and said member supporting means for biasing said supporting means apart, second resilient means for biasing both said supporting means in a downward direction, means for lowering said body and means responsive to lowering of said body a predetermined extent for compressing said first resilient means to raise said support ring into a plane above said shape maintaining member and level with the air guide.

4. The apparatus as defined in claim 3 further including means for conveying air to the bottom of said body, said body having passages in the bottom thereof extending up the sidewall and opening into the interior thereof for conveying cooling air to the interior of said body and wherein said means within said body for supporting said ring is effective upon the lowering of said body to block the flow of air from said passages into said body.

References Cited in the file of this patent
UNITED STATES PATENTS

| | | |
|---|---|---|
| 1,518,852 | Johnson | Dec. 9, 1924 |
| 1,670,821 | Pawling et al. | May 22, 1928 |
| 2,379,830 | Samuelson et al. | July 3, 1945 |
| 2,508,890 | Rowe | May 23, 1950 |
| 2,755,597 | Rowe | July 24, 1956 |
| 2,833,088 | Olson et al. | May 6, 1958 |
| 2,994,986 | Rowe | Aug. 8, 1961 |